United States Patent [19]

Pudney et al.

[11] Patent Number: 4,835,692
[45] Date of Patent: May 30, 1989

[54] REMOTE CONTROLLED TRAVEL APPARATUS

[75] Inventors: Jack L. Pudney, Dandenong; Richard M. Baird, East Malvern, both of Australia

[73] Assignee: Bridge & Plate Construction Pty. Ltd., Dandenong, Australia

[21] Appl. No.: 9,955

[22] Filed: Feb. 2, 1987

[30] Foreign Application Priority Data

Feb. 5, 1986 [AU] Australia ............................. PH4450

[51] Int. Cl.[4] ............................................. G06F 15/50
[52] U.S. Cl. ................................. 364/424.01; 180/169
[58] Field of Search .................. 364/424, 443, 424.01, 364/424.02; 180/167, 168, 169

[56] References Cited

U.S. PATENT DOCUMENTS

| | | | |
|---|---|---|---|
| 4,119,900 | 10/1978 | Kremnitz | 364/424 |
| 4,328,545 | 5/1982 | Perdue | 364/513 |
| 4,482,960 | 11/1984 | Pryor | 364/424 |
| 4,626,995 | 12/1986 | Lofgren et al. | 364/424 |
| 4,630,216 | 12/1986 | Tyler et al. | 364/478 |
| 4,679,152 | 7/1987 | Perdue | 364/513 |
| 4,710,020 | 12/1987 | Maddox et al. | 364/424 |

*Primary Examiner*—Parshotam S. Lall
*Assistant Examiner*—Thomas G. Black
*Attorney, Agent, or Firm*—Hovey, Williams, Timmons & Collins

[57] ABSTRACT

A remote controlled apparatus particularly for shelf servicing within warehouses. A vehicle is provided for travelling along a path between a plurality of locations. The vehicle has drive means operable for driving the vehicle along the path. Command control means operates the drive means. The control means includes a distance measuring apparatus having an electromagnetic radiation generating unit carried by the vehicle and operable to generate an electromagnetic radiation beam. One or more radiation receiving mirrors are fixed in predetermined relationship to vehicle locations and arranged to receive and reflect back electromagnetic radiation beams from the generating unit. Upon beam reflection, with the generating unit initiates an output signal representative of the distance between the generating unit and a receiving mirror. The control means functions on the basis of the initiated output signal to generate a signal representative of a current location of the vehicle relative to a desired preselected location and to operate the drive means as necessary to move the vehicle along the path to that preselected location.

18 Claims, 1 Drawing Sheet

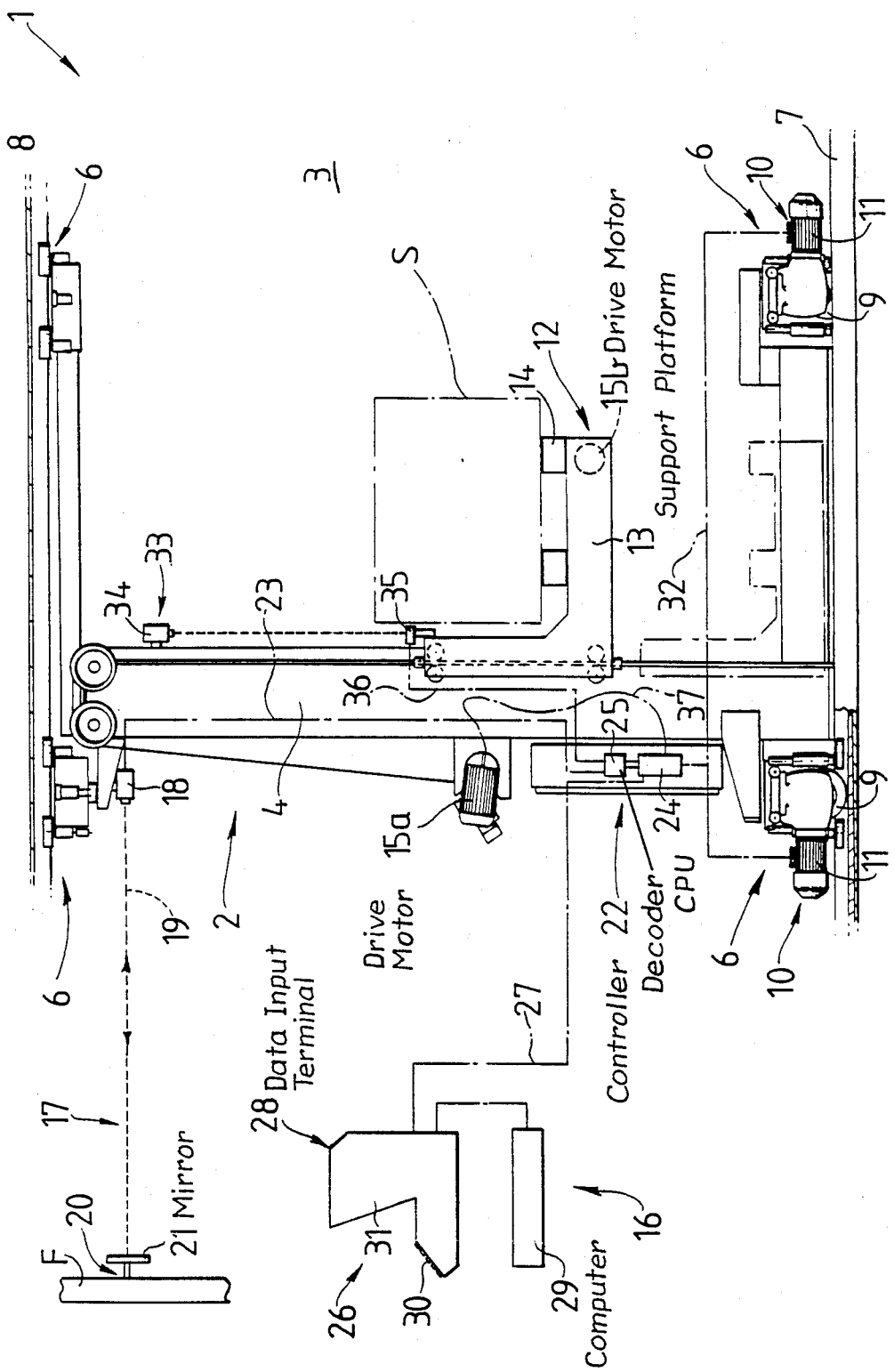

REMOTE CONTROLLED TRAVEL APPARATUS

BACKGROUND OF THE INVENTION

This invention relates generally to remote controlled travel apparatus, and in particular to such apparatus that includes a track guided vehicle automatically controlled in its travel between positions along the track. The apparatus is applicable as part of a warehouse stock stacking and retrieval system, and it will be convenient to hereinafter disclose the invention in relation to that exemplary application. It should be appreciated, however, that the apparatus is not limited to that application.

A number of shelf servicing transportation systems have been developed and installed in warehouses for stocking and retrieving shelf stock. These systems generally include a vehicle mounted between upper and lower guide tracks extending along shelving aisles or corridors, for running along the tracks to stack stock onto the shelving and retrieve the stock therefrom as necessary.

Initially, travel of the vehicle and stock stacking retrieval operations were controlled manually in the sense that an operator usually travelled with the vehicle manually operating controls carried on the vehicle. More recently, however, those vehicles have become remotely controlled, with a single operator positioned at a distant control station and initiating travel and operating command signals to one or more unmanned vehicles.

The command signals to the vehicles are generally Provided through a computer based control system which, inter alia, monitors the actual vehicle position and travel within the warehouse. In that regard, it is important for the system to know and monitor the vehicle's position to determine where it must travel to stack and/or retrieve stock in response to given command signals. That has been achieved by using the guide track as a measured reference grid and moving the vehicle along the track a predetermined distance to shift the vehicle from one reference grid point to another point. With stock shelves each having separate known grid points it becomes possible for the vehicle to travel to and from shelves for stock stacking and/or retrieval.

Various arrangements have been developed for measuring the distance a vehicle is required to travel between points. They include odometer means which count revolutions of the vehicle wheels and relate that to the distance travelled, and flag means strategically placed about the grid which are triggered by the passing vehicle to signal its presence which again can be related back to the distance travelled by the vehicles. These arrangements have not been found to be particularly accurate or efficient. In that regard, the odometer means tends to become progressively inaccurate with distance travelled through wheel rotation aberrations, particularly wheel spin and skid, which inaccuracies tend to compound through successive vehicle movements. Depending on the extensiveness of placement, the flag means may only provide an approximate indication of vehicle position and distance travelled so that accurate monitoring is difficult. In any event, flag means is prone to failure or damage thereby reducing its effectiveness.

SUMMARY OF THE INVENTION

It is an object of the present invention to alleviate these disadvantages through the provision of an alternative remote controlled apparatus, particularly suitable for use in a warehouse stock stacking and retrieval system.

With that object in mind, the present invention provides a remote controlled apparatus including: a vehicle for travelling along a path between a plurality of locations, the vehicle having drive means operable for driving the vehicle along the path; and, command control means for operating the drive means to drive the vehicle, the control means including a distance measuring apparatus having an electromagnetic radiation generating means carried by the vehicle and operable to generate electromagnetic radiation and having radiation receiving means fixed in predetermined relationship to vehicle locations and arranged to receive electromagnetic radiation from the generating means, with the generating means initiating an output signal representative of the distance between the generating means and the receiving means, the control means functioning on the basis of the initiated output signal to generate a signal representative of a current location of the vehicle relative to a desired preselected location and to operate the drive means as necessary to move the vehicle along the path to that preselected location.

Preferably, the radiation generating means of the distance measuring apparatus includes a unit operable to emit a beam of electromagnetic radiation, such as infra red radiation. Moreover, preferably the unit is fixed to the vehicle so that the emitted beam extends parallel to a straight line of travel of that vehicle at any one time. That is, where the vehicle is travelling along a straight path section then the beam will extend parallel to that path section and when travelling along a non-straight path section (i.e. a curved section) then the beam will extend parallel to a line lying tangentially to that path section.

Preferably, the radiation receiving means includes an array of receiving devices fixed in predetermined relationship to the vehicle locations. The array is preferably configured about the vehicle travel path so that, during apparatus use, the emitted radiation beam will be received by only one device at any one time. Moreover, the devices are arranged so that, during apparatus use, the beam will always be received be one of the devices at least while the vehicle is travelling along any straight path section.

Preferably, the receiving devices are constructed so as to reflect a received radiation beam back to the radiation generating unit. The generating unit is preferably constructed and arranged to interpret one or more characteristics of that reflected beam to determine the distance between the generating unit and receiving device, and generate the distance output signal representative thereof. The output signal is preferably at least substantially continuously generated whilst the generating unit emits the radiation beam and the beam is reflected back to the unit.

The control means preferably also includes an operations controller which is connected to receive the output signal of the radiation generating unit and which functions to operate drive means of the vehicle as necessary to cause vehicle travel. In particular, the controller functions to receive that distance output signal, compare it with a reference signal representative of a desired preselected vehicle location, and operate the drive means of the vehicle as necessary to cause vehicle travel. In particular, the controller functions to receive that distance output signal, compare it with a reference signal representative of a desired Preselected vehicle location, and operate the drive means until the vehicle travels to where the output signal equates with the reference signal. That signal equation will occur when the vehicle reaches the preselected vehicle location.

The control means preferably also includes a date inputter which is connected to the operations controller and operable to provide desired reference signals thereto. That inputter is preferably operable by personnel in charge of the apparatus, which in the exemplary application may be a warehouse stock controller.

DESCRIPTION OF THE DRAWING

The single drawing FIGURE illustrates the preferred embodiment of the remote controlled apparatus for shelf servicing within warehouses according to the present invention.

The following description refers to a preferred embodiment of the apparatus of the present invention. To facilitate an understanding of the invention, reference is made in the description to the accompanying drawing where the apparatus is schematically illustrated. It is to be understood that the invention is not limited to the embodiment as hereinafter described and as illustrated.

DETAILED DESCRIPTION OF THE PREFERRED EMBODIMENT

Referring to the drawing there is generally illustrated apparatus 1, including vehicle 2, mounted for travel along path 3, between spaced locations. Vehicle 2, is of any suitable construction having regard to the intended application of apparatus 1. Thus, in the exemplary application, a warehouse stock stacking and retrieval vehicle is provided for travelling through a warehouse (not illustrated) between locations at which stock is stacked and/or retrieved. One such vehicle 2, is generally disclosed in applicant's co-pending Australian application No. 54015/86 which is suitable for use in apparatus 1. It should be appreciated, however, that various other vehicles 2, may also be suitable.

Broadly, vehicle 2, for the exemplary application includes frame 4, carried by a plurality of mounting assemblies 6, through which vehicle 2, is mounted to and between upper and lower guide tracks 7,8, for travel therealong. Tracks 7,8, extend along path 3, and are generally laid along and between corridors formed between stock shelving, with vehicle 2, travelling to stock stacking and retrieval locations therealong. Each mounting assembly 6, includes at least one guide wheel 9, which rolls along tracks 7,8, during that travel. Drive means 10, is mounted on vehicle frame 4, and includes at least one motor 11, coupled to at least one guide wheel 9, so that operation of drive means 10, rotates wheel(s) 9, engaging lower guide track 7, to cause vehicle travel.

Vehicle 2, for the exemplary application, also includes load carrying unit 12, mounted on frame 4, to support and carry stock S, during vehicle travel. Typically, unit 12, includes support platform 13, on which stock S, is loaded, platform 13, and sections thereof such as support fork section 14, being movable relative to frame 4, for fine positioning at stock stations at each vehicle location. In particular, platform 13, may be vertically movable to position itself adjacent a specific stock station in multi-layer stock shelving, and at least support fork section 14, may be horizontally movable to position itself in the station. In this way, successive platform movements can stack or retrieve stock S, in specific shelves at each vehicle location. Drive means 10, includes further drive motors 15a,15b, coupled to support platform 13, for operation so as to move platform 13, and support fork section 14, thereof, respectively.

Incorporated into apparatus 1, is command control means 16, for operating drive means 10, and in particular motors 11, to cause vehicle travel along tracks 7,8. Control means 16, is operable by an apparatus operator (not illustrated) who may conveniently be located remote from vehicle 2.

Control means 16, includes distance measuring apparatus 17, which has electromagnetic radiation generating unit 18, mounted on vehciel frame 4, adjacent guide track 8, and operable to emit pencil beam 19, of radiation. That radiation is infrared in this embodiment. Unit 18, is fixed to frame 4, so that beam 19, extends parallel to a straight line of travel of vehicle 2, along path 3.

Generating unit 18, may be a conventional survey distance monitoring instrument, suitable instruments currently being marketed by Sokkisha of Japan, and Total Control System of United States of America. Distance measuring apparatus 17, also has at least one radiation receiving device 20, (only one of which is illustrated), to receive beam 19, from radiation generating unit 18. Typically, an array of devices 20, will be fixed about path 3, in such a way that emitted beam 19, will be received by only one device 20, at any one time, and generally always by one device 20, during vehicle travel. Device 20 includes a receiving mirror 21, fixed with its reflection surface lying in a plane perpendicular to emitted radiation beam 19, received thereby so as to reflect received beam 19, back to radiation generating unit 18.

Mirrors 21, within an array of devices 20, are arranged at least one each adjacent respective ends of straight path sections travelled by vehicle 2. There may be a respective mirror 21, adjacent each straight path section end, so that beam 19, from radiation generating unit 18, will be received and reflected by a mirror 21, regardless of the direction of beam emission during vehicle travel. However, where beam 19, is emitted only in one direction (as illustrated) along any straight path section, then only one mirror 21, need be positioned adjacent that path section end toward which beam 19, is emitted.

Mirrors 21, are fixed to any suitable stationary structure adjacent the travel path. In the exemplary application, they may be fixed to frame work F, of the warehouse in which apparatus 1, is installed.

On receiving reflected beam 19, radiation generating unit 18, is operable to interpret one or more beam characteristics to determine the distance between generating unit 18, and mirror 21. In consequence of that operation, a distance output signal representative of the determined distance is generated. That signal is conveniently an RS 232 serial output signal.

Control means 16, further includes operations controller 22, mounted on frame 4, and connected through line 23, to receive the output signal from radiation generating unit 18. Specifically, controller 22, includes a central processing unit 24, (CPU) for directly or indirectly receiving the distance output signal of radiation generating unit 18. As necessary, controller 22, may also include decoder 25, interposed between radiation generating unit 18, and CPU 24, for converting the distance output signal into an acceptable input signal to CPU 24. Thus, where the output signal is an RS 232 serial output signal then decoder 25, may convert that signal into a 16 bit parallel input signal to CPU 24.

Input signals received by CPU 24, are compared with a reference signal representative of a desired preselected vehicle location. This reference signal is supplied to CPU 24, by remote data inputter 26, through line 27. Data inputter 26, includes data input terminal 28, at which an operator (not illustrated) is located and supplies data on the preselected locations to which vehicle 2, is to travel. That data determines the reference signals. In that regard, the reference signals may be directly inputted by the operator. Alternatively, the operator may simply supply analog information that may be related to the application of apparatus 1, which in turn is converted into the reference signals. Thus, in the exemplary application, the operator may input instructions on the movement of stock to or from particular vehicle locations.

Data inputter 26, may be constructed to provide two or more successive reference signals to operations controller 22, and in particular CPU 24. In this way, vehicle 2, may be sequentially moved between various locations upon a single data supply through input terminal 28. Again, that data may directly or indirectly supply the set of reference signals. In the exemplary application, an indirect set of signals may be provided by analog instructions on sequentional stock movement, such as retrieval of a particular stock from one vehicle location and transfer to another location.

Data inputter 26, may include computer 29, with input terminal 28, being a suitable computer input console. Terminal 28, may include keyboard 30, in which analog instructions are supplied and visual display unit 31, on which those instructions can be displayed. As necessary, computer 29, functions to convert the instructions into one or more reference signals for CPU 24.

The input and reference signals received by CPU 24, are representative of co-ordinates of the current and preselected locations, respectively, of vehicle 2. Thus, path 3, along which vehicle 2, can travel lies within a co-ordinate datum system so that each vehicle location along path 3, can be determined in terms of co-ordinates of that system. Mirrors 2, are also incorporated into that system, with their location co-ordinates being constant and known so as to provide a reference for determining, through the distance output signals, the co-ordinates of generating unit 18, and thus location of vehicle 2. The system may provide co-ordinates of a finite or infinte number of vehicle locations, any finite number being sufficiently large so as to not adversely affect accuracy of vehicle positioning on path 3. The co-ordinate system provides at least a pair of co-ordinates for each mirror and vehicle location. In the exemplary application, those co-ordinates may equate to the actual corridor in which any one vehicle location is positioned, and the distance along that corridor at which a location is positioned.

CPU 24, is operable to generate output signals in response to a comparison between the input and reference signals, which output signals then directly or indirectly control operation of drive means 10. In particular, the CPU output signals control operation of drive motors 11, for causing vehicle travel to and between vehicle locations along path 3. The output signals may be received directly by drive motors 11, through line 32, (as illustrated) or indirectly through appropriate signal converter devices (not illustrated). The output signals vary in characteristic depending on whether the input and reference signals equate, one variation initiating drive means operation and another variation ceasing operation. The variations may be a signal presence and absence, or different signal levels, or any other suitable characteristic to which drive means 10, may be directly or indirectly responsive.

Command control means 16, may provide additional functions for control operation of vehicle 2, depending on the precise vehicle construction and application. In the exemplary application of a vehicle constructed as outlined above, control means 16, may also function to operate further drive motors 15a, and/or 15b, for load carrying unit 12. In this way, control means 16, can not only locate the vehicle as desired along path 3, but also position load carrying unit 12, at a stock station at those vehicle locations.

In one arrangement, load carrying unit positioning may be achieved at least in part by including one or more further distance measuring apparatus 33, within control means 16. This may be particularly suitable in the exemplary application where there are a multitude of stock stations at various relative locations i.e. the stock stations are not in a regular or orderly arrangement. One further measuring apparatus 33, may be mounted on vehicle 2, radiation generating unit 34, and radiation receiving device 35, being fixed on vehicle frame 4, and load carrying unit 12, respectively. This apparatus 33, provides a distance output signal from generating unit 34, representative of the separation distance supplied through line 36, to CPU 24, and on which CPU 24, can base generation of an output signal supplied to motor 15a, through line 37.

In this arrangement, another distance measuring apparatus (not illustrated) could also be mounted on load carrying unit 12, to similarly enable CPU 24, to generate an output signal for supply to motor 15b.

This arrangement may necessitate extension of the co-ordinate datum system to include stock stations as well as vehicle locations along the vehicle path. In that regard, at least one additional co-ordinate may be required which in the exemplary application will equate with the distance above the corridor floor at which any one stock station is positioned. In an alternative arrangement, particularly suitable in the exemplary application where multiple stock stations are in a regular or ordered arrangement, separate positioning apparatus (not illustrated) may be provided for load carrying unit 12. In that regard, vertical location may be achieved by a counter unit mounted on load carrying unit 12, and operable to recognize and/or count passing indicia provided on the relatively stationary vehicle frame 4. This counter unit inititates an output signal representative of each passing indicia. Since the indicia can be fixed in a known relation to vertical positions of the stock stations, then output signals are effectively representative of current vertical positions of load carrying unit 12, relative to those stations. Again, the output signals can be transmitted directly or indirectly to CPU 24, for comparison with reference signals provided by computer 29, from input data, and output signals generated from the CPU for drive motor 15a. The reference signals may be representative of indicia that will be recognized and/or counted by the counter unit when load carrying unit 12 is in the desired vertical location.

In an alternative arrangement, the positioning apparatus may simply provide two horizontal positions for load carrying unit 12, or at least support fork section 14, thereof, namely retracted out of the stock station and extending into that station. Again, that movement may be initiated by output signals generated from CPU 24, to drive motor 15b.

It should be appreciated in any arrangement for moving load carrying unit 12, that control means 16, will function so that movement of load carrying unit 12, to preselected stock stations will be sequentially co-ordinated with travel of vehicle 2, to preselected locations. In general, control means 16, will function so that vehicle 2, travels to a preselected location and then load carrying unit 12, is moved at that vehicle location to and from a preselected stock station to stack or retrieve stock. That may be achieved, by ensuring that CPU 24, generates output signals to drive motors 11, 15a and 15b, in a programmed sequence. In particular generation of output signals to move support fork section 14, may be dependent on vehicle 2, and load carrying unit 12, first being in their preselected locations or at least being adjacent thereto. Thus, only when vehicle 2, and load carrying unit 12, are in those preselected locations or adjacent thereto will the output signals initiate horizontal positioning. Similarly, provision of output signals for vertical movement of load carrying unit 12, may be dependent on vehicle 2, and support fork section 14, being in preselected locations or at least adjacent thereto. Thus, only when support fork section 14, is in a preselected position, such as a retracted or extended position, will output signals initiate vertical location of load carrying unit 12, or travel of vehicle 2.

Depending on the nature of stock stacking in the exemplary application, it may be appropriate for the output signals to have a programmed sequence that enables complex movement of load carrying unit 12, and support fork section 14, thereof at least immediately adjacent the stock stations. Thus, load carrying unit 12, and support fork section 14, thereof may move simultaneously and/or in quick successive alternation to facilitate maneuvering of stock onto and from shelving at the stock stations. Thus, for example, load carrying unit 12, may shift vertically marginally at the stock stations so that support fork section 14, can easily engage and disengage stock as necessary for stock stacking and retrieval and horizontal movement of support fork section 14.

In using a preferred embodiment of apparatus 1, in the exemplary application, it is simply necessary for a warehouse stock controller to input analog information on stock requirements into data input terminal 28. Thereafter, control means 16, through computer 29, and CPU 24, control operation of drive motors 11, 15a, 15b, to operate the vehicle to carry out those instructions and shift the stock. That stock movement may include retrieval of stored stock from a particular station and transfer of the stock to another station which may be either a storage station or perhaps a despatch station. It is envisaged that the analog information supplied will comprise a stock number together with instructions for transfer of that particular stock.

The apparatus of the present invention provides for precise and efficient remote control of a vehicle so that it is possible to accurately monitor vehicle travel and positioning. The apparatus is particularly suitable for use in a warehouse stock stacking and retrieval system, with the automatic and remote control of the vehicle leading to a reduction in system maintenance and operating costs. In consequence, stock storage and handling within warehouses may be kept to a minimum.

Finally, it is to be understood that various modifications and/or alterations may be made to the apparatus without departing from the ambit of the present invention as defined in the claims appended hereto.

Having now described my invention what I claim as new and desire to secure by Letters Patent is:

1. A controlled vehicle system including: a vehicle path; a vehicle for travelling along the vehicle path from a current location to a preselected location, the vehicle having drive means capable for driving the vehicle along the path; and, common control means for operating the drive means to drive the vehicle, the control means including a distance measuring apparatus having an electromagnetic radiation generating means carried by the vehicle and operable to generate electromagnetic radiation and having radiation receiving means fixed in known positions relative to the vehicle path, the receiving means receiving electromagnetic radiation from the generating means and reflecting the radiation back to the generating means to provide information to the generating means for determining the distance between the generating means and the receiving means, the generating means generating and output signal representative of the distance between the generating means and the receiving means, the control means processing the output signal from the generating means to generate a signal representative of the current location of the vehicle relative to the preselected location and to operate the drive means as necessary to move the vehicle along the path from the current location to that preselected location.

2. A system as claimed in claim 1, wherein the generating means includes a generating unit operable to emit a beam of electromagnetic radiation.

3. A system as claimed in claim 2, wherein the radiation beam is at least substantially continuously emitted during vehicle travel.

4. A system is claimed in claim 3, wherein the radiation beam is a pencil-like beam of infra-red radiation.

5. A system as claimed in claim 2, wherein the generating unit is fixed to the vehicle and the emitted beam extends parallel to a straight line of vehicle travel at any one time, so that when the vehicle travels along a straight path section the beam extends parallel to that path section and when travelling along a non-straight path section then the beam extends parallel to a line lying tangentially to that path section.

6. A system as claimed in claim 1, wherein an array of the receiving devices are provided, the array being configured so that, during apparatus use, the emitted electromagnetic radiation will be received by, and reflected from, only one device at any one time.

7. A system as claimed in claim 6, wherein each receiving device includes a receiving mirror having a plane reflecting surface, the reflecting surface lying in a plane perpendicular to emitted radiation received thereby.

8. A system as claimed in claim 1, wherein the control means also includes an operations controller connected to receive the output signal of the generating means and which functions to compare that signal with a reference signal representative of the preselected vehicle location and operate the vehicle drive means to move the vehicle until the output signal matches the reference signal whereup the vehicle will be in the preselected location.

9. A system as claimed in claim 8, wherein the operations controller includes an electronic central processing unit for directly or indirectly receiving the distance output signal of the generating means.

10. A system as claimed in claim 9, wherein the operations controller also includes a decoder interposed between the generating means and the central processing unit for converting the distance output signal into an input signal to the central processing unit.

11. A system as claimed in claim 10, wherein the distance output signal is an RS 232 serial output signal and the input signal is a 16 bit parallel signal.

12. A system as claimed in claim 11, wherein the input and reference signals are representative of coordinates of the current and preselected locations, respectively, of the vehicle within a coordinate datum system containing the path along with the vehicle can travel.

13. A system as claimed in claim 10, wherein the central processing unit is operable to generate output signals in response to a comparison of the input and reference signals, which output signals directly or indirectly control operation of the drive means.

14. A system as claimed in claim 8, wherein the control means also includes a data inputter located remote from the vehicle, and connected to the operations controller and operable to provide the reference signals thereto.

15. A system as claimed in claim 14, wherein the data inputter includes a data input terminal at which an operator can input information of the preselected location for the vehicle.

16. A system as claimed in claim 15, wherein the data inputter includes a computer with the input terminal being a computer input console including a keyboard for keying in the input information.

17. A system as claimed in claim 1, wherein the vehicle is a track guided stock stacking and retrieval vehicle travelling on one or more vehicle tracks extending along the path.

18. A system as claimed in claim 17, wherein the vehicle includes a frame that moves along the tracks during vehicle travel and a load carrying unit mounted on the frame for supporting and carrying stock during vehicle travel, the load carrying unit being movable relative to the frame, and wherein the control means further includes one or more additional distance measuring apparatus mounted on the vehicle, one of the radiation generating means and receiving means of that additional distance measuring apparatus being fixed on the load carrying unit and the other one being fixed on the vehicle frame, the additional distance measuring apparatus generating a distance output signal representative of the separation distance between the generating means and receiving means, the control means processing the output signal from the generating means to generate a signal representative of a current location of the load carrying unit relative to a desired preselected location and initiate movement of the load carrying unit to that preselected location.

* * * * *